United States Patent [19]
Johansson

[11] Patent Number: 5,479,839
[45] Date of Patent: Jan. 2, 1996

[54] METHOD FOR CUTTING TUBES, WHERE TUBES ARE MOVED INTO THE CUTTING POSITION BY A ROTATABLE CLAMPING PLATE

[75] Inventor: Jan Johansson, Byske, Sweden

[73] Assignee: Renholmens Mekaniska Verkstad AB, Byske, Sweden

[21] Appl. No.: 78,308

[22] PCT Filed: Dec. 18, 1991

[86] PCT No.: PCT/SE91/00875

§ 371 Date: Oct. 18, 1993

§ 102(e) Date: Oct. 18, 1993

[87] PCT Pub. No.: WO92/11111

PCT Pub. Date: Jul. 9, 1992

[30] Foreign Application Priority Data

Dec. 18, 1990 [SE] Sweden .................................. 9004040

[51] Int. Cl.⁶ ............................ B23D 21/04; B23D 47/04
[52] U.S. Cl. .................................... 83/23; 83/54; 83/165; 83/409.1; 83/411.7; 83/733; 83/467.1
[58] Field of Search .............................. 83/23, 54, 409.1, 83/410.7, 411.7, 417, 460, 461, 467.1, 733, 165, 563

[56] References Cited

U.S. PATENT DOCUMENTS

| | | | |
|---|---|---|---|
| 2,123,580 | 7/1938 | Wheless | 83/409.1 |
| 2,559,378 | 7/1951 | Stalder | 83/733 |
| 3,141,482 | 7/1964 | Arness | 83/417 X |
| 3,908,495 | 9/1975 | Bush, Jr. et al. | 83/733 X |
| 4,031,788 | 6/1977 | Boge et al. | 83/460 X |
| 4,515,196 | 5/1985 | Shields | 83/411.7 X |
| 4,732,066 | 3/1988 | Del Fabro et al. | 83/467.1 X |
| 4,957,022 | 9/1990 | Harris | 83/54 X |

FOREIGN PATENT DOCUMENTS

| | | |
|---|---|---|
| 0400530 | 5/1990 | European Pat. Off. |
| 7341918 | 6/1975 | France . |
| 1007146 | 7/1953 | Germany . |
| 1552599 | 4/1970 | Germany . |
| 2342645 | 8/1973 | Germany . |
| 3030181 | 8/1980 | Germany . |

*Primary Examiner*—Eugenia Jones
*Attorney, Agent, or Firm*—John Lezdey

[57] ABSTRACT

A method is provided for cutting pipes, preferably welded pipes in conjunction with welding the pipes in a welding machine, and for cutting the pipes at a rate determined by the welding machine. At the same time a pipe is cut in a cutting position by a raisable and lowerable cutting device, the next pipe to be cut is fed to a pipe collecting position. The collecting position is displaced in relation to the cutting position, such that when the cutting device returns to its starting position upon completion of a cutting operation, the pipe is advanced one step to the pipe cutting position while simultaneously, the preceding pipe is advanced to the pipe collecting position.

3 Claims, 7 Drawing Sheets

METHOD FOR CUTTING TUBES, WHERE TUBES ARE MOVED INTO THE CUTTING POSITION BY A ROTATABLE CLAMPING PLATE

BACKGROUND OF THE INVENTION

1. Field of the Invention

The present invention relates to a method and machine for cutting pipes, or piping, and then particularly for cutting welded pipes, or piping, in the vicinity of a pipe welding machine.

2. Description of the Prior Art

Pipe welding machines for continuously welding pipes, or tubes, have undergone very rapid development in recent years, and present day welding machines are capable of handling 200 m of piping, per minute in the case of piping of smaller dimensions, and can be expected to reach a future capacity of up to 300 m of welded piping, or tubing, per minute.

For reasons of productivity, it has been found advangeous, and in many cases even necessary, to effect at least one cutting operation in direct connection with the welding machine, and in order not to limit the capacity of the welding machine in this case, the cutting equipment used must have at least the same capacity as the welding machine, although pipe cutting equipment which will satisfy these capacity requirements is not yet commercially available.

SUMMARY OF THE INVENTION

It is therefore the object of this invention to solve the aforesaid problem and to provide a pipe cutting method and a pipe cutting machine which will enable piping, or tubing, to be cut in direct connection with welding machines without reducing the capacity thereof, i.e. at a rate which corresponds at least to a pipe welding capacity of up to 300 m of pipe per minute, or higher.

This object is achieved with the method and machine according to the invention, having the characteristic features set forth in the following claims.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
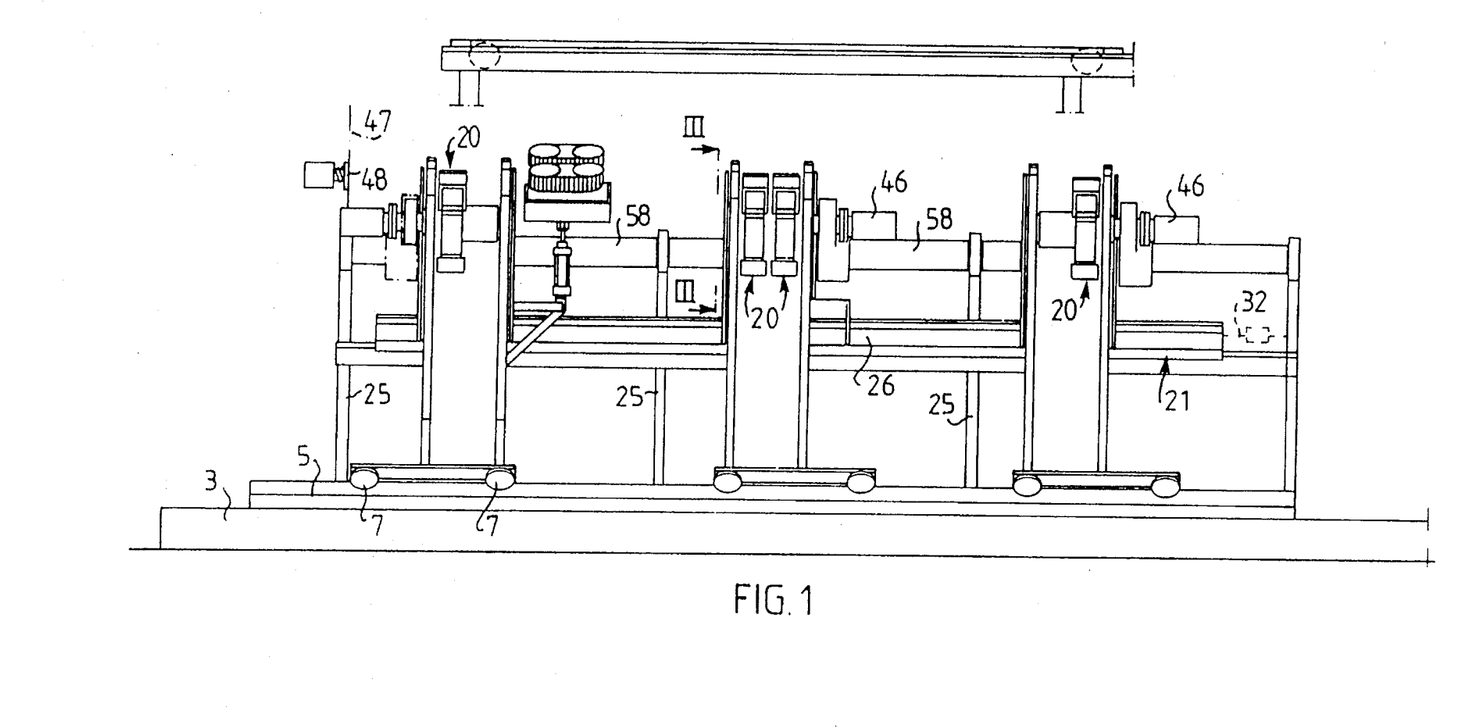
FIGS. 1 and 2 illustrate schematically a side view and a top view respectively of an inventive pipe cutting machine.

The illustrated cutting machine includes at least one cutting unit, generally referenced 1, and a plurality of support trestles 2 on each side of the cutting unit 1, wherein the support trestles on the left of the cutting unit in FIG. 1 have a left-hand design, while those located on the right of the cutting unit have a right-hand design. The number of support trestles 2 each side of a cutting unit 1 may vary, and the number used will depend on the length of the piping to be cut, which may be in excess of 20 m, and on the mutual spacing between trestles 2 and between cutting units 1 and adjacent trestles 2, this distance being adjusted in relation to the wall thicknesses of the piping to be cut, so that the piping will show no tendency to sag between the trestles 2 and between cutting unit 1 and adjacent support trestles 2.

The trestles 2 and each cutting unit 1 included in the machine are arranged in a line beside one another on a foundation 3, which stationarily supports two mutually parallel guide rails 4 and 5 which extend along a major part of the length of the foundation and which coact with respective carriage wheels or rollers 6 and 7 of each cutting unit 1 and support trestle 2. The carriage wheels referenced 7 are arranged in pairs at both the forward and the rearward part of respective cutting units 1 and support trestles 2 with the axles of said wheels defining an angle therebetween, for instance a right angle, so as to abut upwardly facing guide surfaces 8 of that one of the two guide rails which has two opposing corners disposed in the vertical plane, said guide surfaces 8 defining therebetween the same angle as that defined by the axles of the carriage wheels. This carriage wheel arrangement ensures that none of the cutting units 1 and support trestles 2 is able to change its position transversely relative to one another and to said line, wherein each cutting unit 1 and each support trestle 2 included in the machine are arranged side-by-side at an appropriate distance apart. Because each cutting unit 1 and support trestle 2 can be moved individually along the guide rails 4 and 5, which extend parallel with said line, it is possible to adjust said distance from one occasion to an other.

For receiving and preferably also buffering incoming piping which is to be cut to given lengths, the illustrated cutting machine includes a roller surface, or roller table 9 which is comprised of two mutually spaced arms 10 mounted in each cutting unit 1 and support trestles 2. The arms are inclined relative to the horizontal plane so that pipe 11 transferred on the arms 10, i.e. the roller table 9 of the machine, will roll automatically into abutment with a stop 12 or with a pipe 11 that has earlier been stopped by said stop 12, i.e. a buffered pipe.

Figure 3:
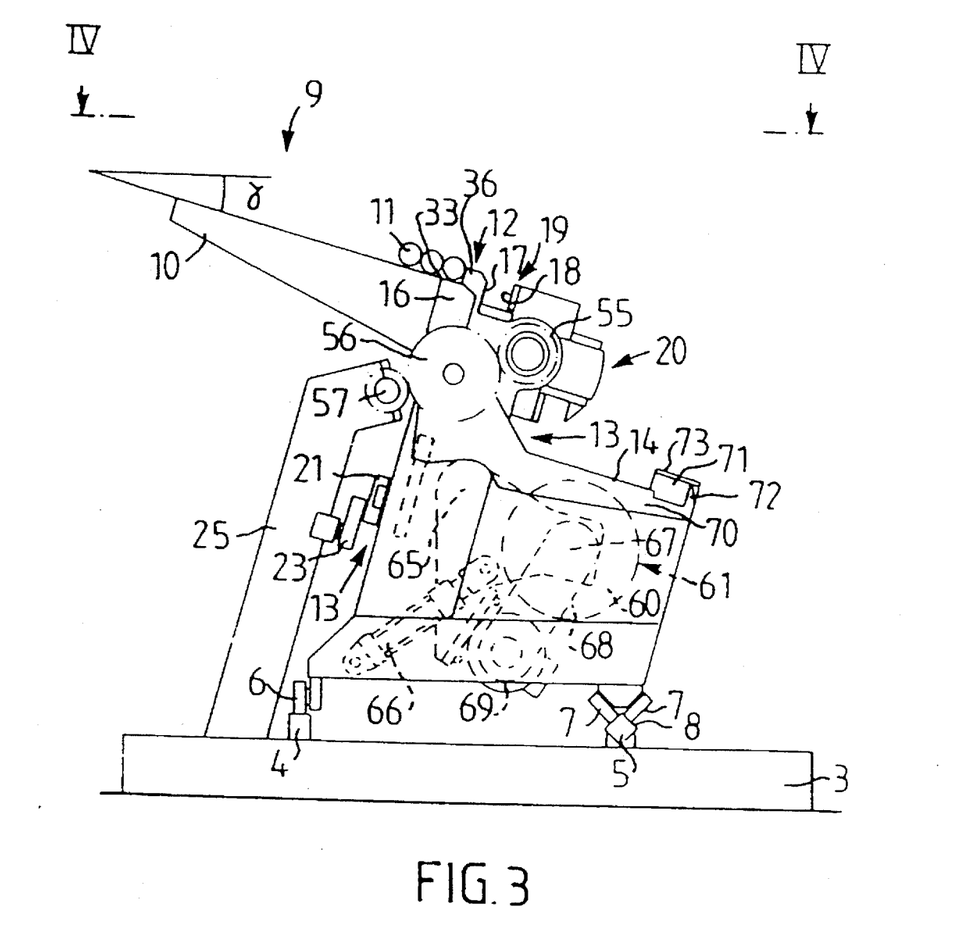
FIG. 3 is a section view of a cutting unit included in the cutting machine, said view being taken generally on the line III—III in FIG. 1.

The pipe 11 next to be cut, i.e. the pipe 11 abutting the stop 12, is fed to a cutting position from the roller table 9 by means of a feeder generally referenced 13. The feeder comprises in each cutting unit 1 and support trestles 2 two mutually spaced feeder arms 14 which are guided in the stands 15 of respective cutting units and support trestles for vertical movement towards and away from an upper and a lower position, this latter position being shown in FIG. 3. Each feeder arm 14 is provided with a lifting shoulder 16 which in the upper position of the feeder arms function to lift the pipe 11 resting against the stop 12 to a level in which the pipe is able to move over the stop, beyond said stop and down into a pocket 19 defined by two jaws 17, 18 of a jaw chuck 20, of which chucks one is provided in each support trestle 2 and in two in each cutting unit 1.

Pivotally mounted on journal pins 22 in a horizontal lifting beam 21 are at least two parallel movement links 23, each of which is carried by a respective journal pin 24. Each of the journal pins 24 projects horizontally from a respective column 25, said columns being mutually spaced in line with one another and connected to the foundation 3.

The side of the horizontal lifting beam 21 which faces towards the support trestles 2 is provided with a longitudinally extending guide groove or channel 26 for coaction with camming rollers 27. Each such camming roller 27 is rotatably mounted on a shaft 28 which is mounted in a cullis 29 which is guided for sliding movement in vertical guide grooves or channels in the stand 15 of respective support trestles and cutting units. Connected to the cullis 29 is a rod 31 whose upper end is connected to one feed arm 14 or to both feed arms 14 of a support trestle 2/cutting unit 1.

The requisite lifting movement is obtained with the aid of at least one linear motor mounted on the feeder 13, for instance in the form of a hydraulic or pneumatic piston-cylinder device, or in the form of an electric ball screw which functions between one of the column stands 25 and a parallel movement link 23 or the lifting beam 21, as indicated schematically with broken lines 32 in FIG. 1, or at least one rotary motor which also acts between a column stand 25 and one of the parallel movement links 23. More specifically, in this latter case the rotary motor will preferably be so arranged in the column stand 25 as to enable one of the parallel movement links 23 to be connected directly to the output shaft of the motor.

When the feeder is in its lower position, the parallel movement links 23 are in their most outwardly swung positions and, thus, when the feeder motor is activated the links 23 will be rotated to a vertical position and, during said rotary movement, move the lifting beam 21 upwards. During this upward movement of the beam 21 the camming rollers 27 located in the guide groove or channel 26 on said beam function to move the rods 31 connected to the feed arms 14, and therewith cause all feed arms 14 with their respective lifting shoulders 16, to move upwards to an upper position, this position being taken when the parallel movement links 23 have been swung up to a position in which they are completely upstanding.

In this upper position of the feeder, the convex, bevelled surface 34 which forms a continuation of the lifting surface 33 on said lifting shoulders moves into register with an inclined surface 35 on the stop 12, said surface sloping in towards the pocket 19 of the jaw chucks in a pipe collecting position. The stop 12 is comprised of one, preferably more, such as two, stop shoulders 36 mounted in the generally U-shaped stand 15, as seen from above, of respective cutting units and support trestles. The stop shoulders 36 may be movably mounted in the stand 15 so as to enable the position of said stop shoulders to be changed in relation to the position of the lifting shoulders 16 on the feeder arms, even though the illustrated lifting shoulders are shown to be mounted stationarily in the stand 15. The lifting surface 33 of respective lifting shoulders also slopes in towards a socket 19 in the jaw chucks 20 in a pipe collecting position, the angle at which the lifting shoulders slope preferably, but not necessarily, being the same as the angle at which the lifting table slopes, i.e. angle α, in relation to the horizontal plane. Due to the slope or inclination of the lifting shoulder surfaces 33, 34, and also the slope or inclination of the bevelled surface 35 of the stop shoulders, it is ensured that each pipe 11 that is lifted by the lifting shoulders 16 of the feeder will roll off said shoulders 16 and down into a pocket 19 in the jaw chucks and located in a pipe collecting position. It can be added in this respect that the lifting shoulders and the stop shoulders 36 are preferably mutually dimensioned and positioned such that the lifting surface 33 on the lifting shoulders 16 exposed to the stop surface 37 of the stop shoulders has a width which is smaller than the pipe diameter but greater than one half of said pipe diameter. Furthermore, the distance, the perpendicular distance, from the stop surface 37 of the stop shoulders to the point 38 at which the bevelled surface 35 of the stop shoulders begins on one side and the point 38 at which the convex, bevelled surface 34 of the lifting shoulder terminates on the other side are generally the same while, at the same time, the maximum lifting height, i.e. the maximum distance moved by the feeder 13 from its lower position to its upper position, is such that the two points will generally coincide in the upper position of the feeder 13. When the stop shoulders 36 are movable, this can be achieved irrespective of pipe diameter.

Figure 8:
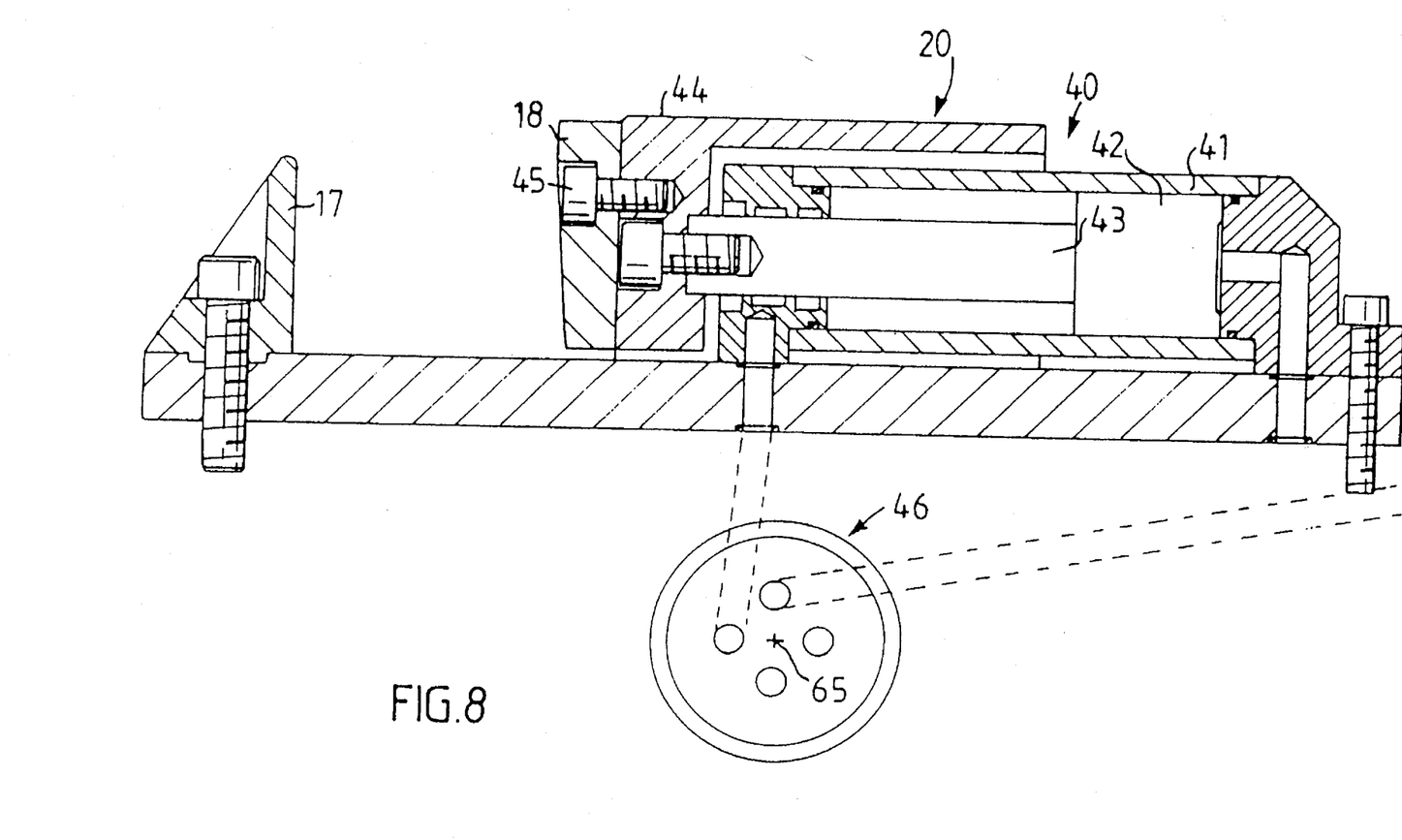
FIG. 8 is a section view of part of a jaw chuck included in the arrangement.

As beforementioned, in the illustrated embodiment of the inventive cutting machine, each support trestle 2 is provided with one single jaw chuck 20, while each cutting unit 1 is provided with two such jaw chucks 20. In principle, the jaw chucks are of identical construction and have identical functions, irrespective of where they are mounted, and consequently only one jaw chuck 20 will be described in detail in the following, with reference to FIGS. 3, 4 and 8.

Figure 5:
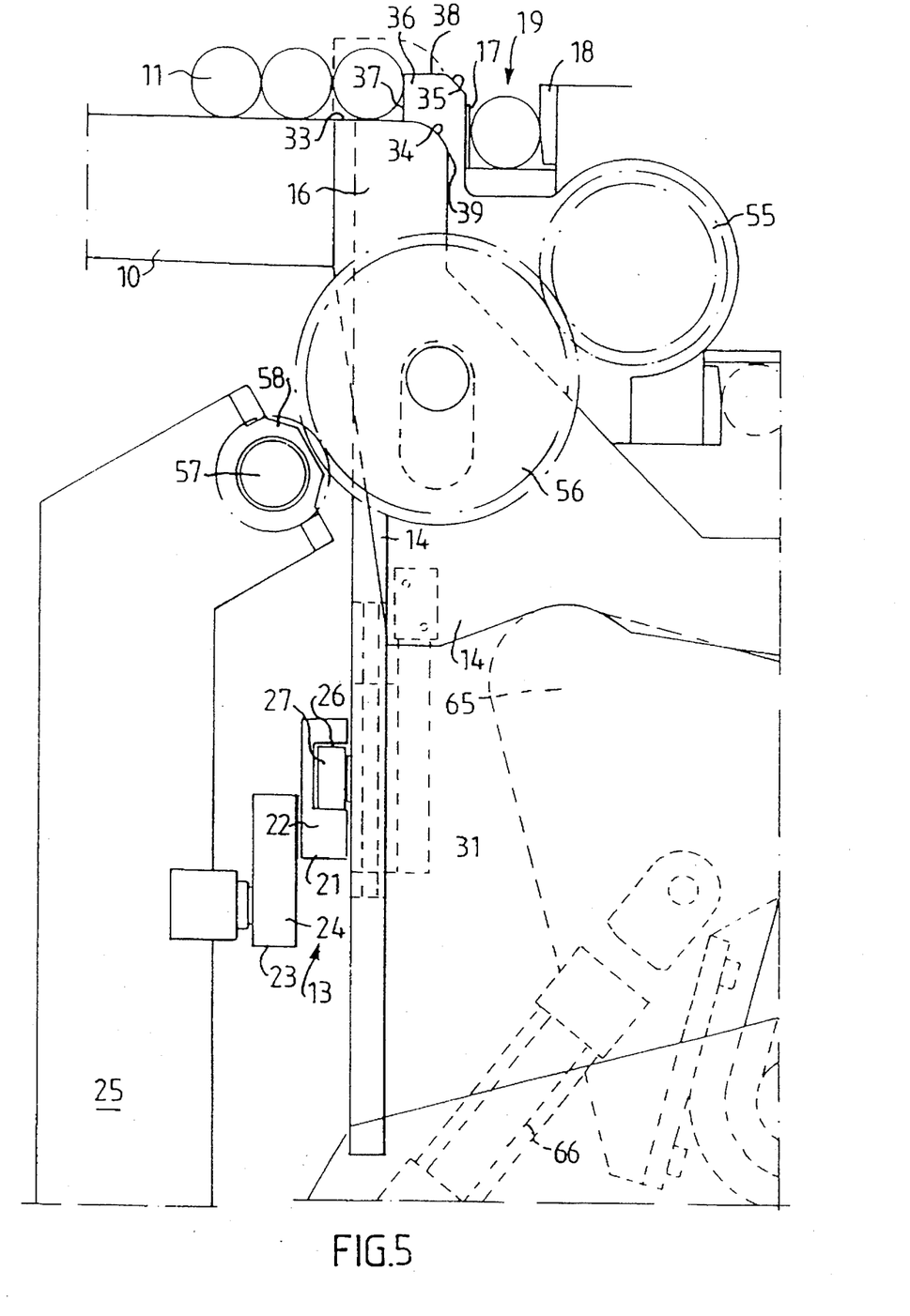
FIG. 5 is an enlarged view of a feeder included in the machine, said view being taken generally on the line III—III in FIG. 1.
Figure 6:
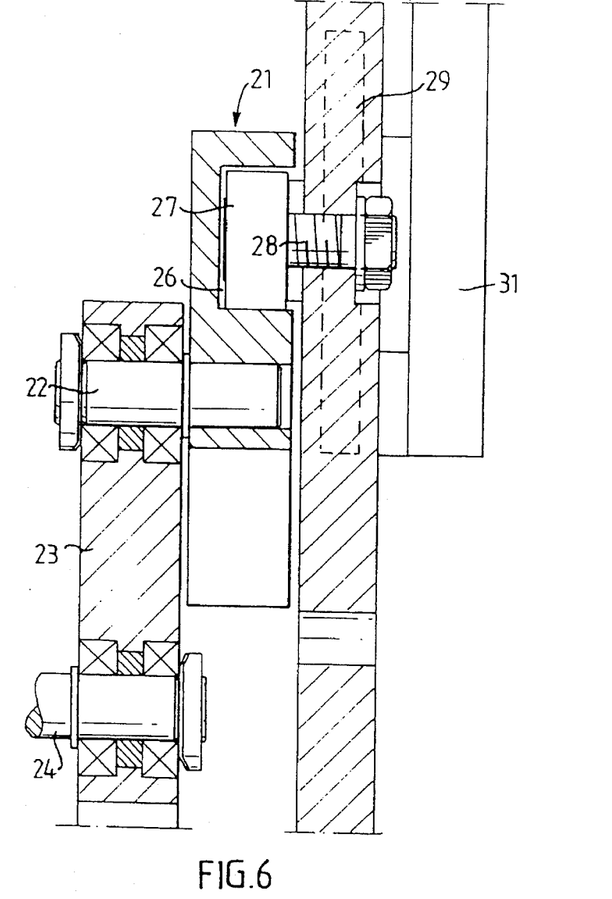
FIG. 6 is a sectional view taken generally on the line VI—VI in FIG. 1.
Figure 7:
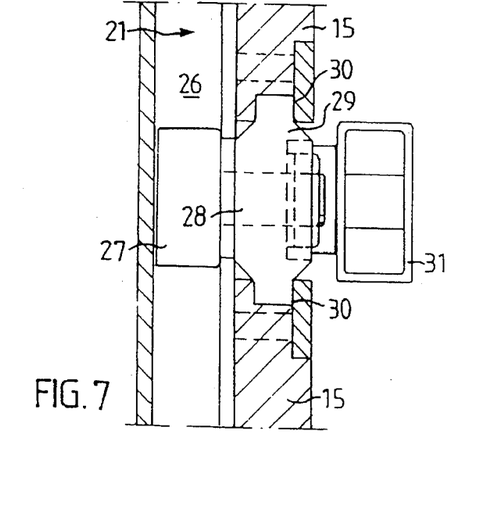
FIG. 7 is a sectional view taken generally on the line VII—VII in FIG. 5.

Each jaw chuck 20 includes two jaw pairs 17, 18 which are displaced relative to one another through an angle of 180°, and the jaws 17, 18 of each jaw pair forms therebetween the aforesaid pocket 19. One jaw 17 of each jaw pair is fixedly mounted, or stationary, while the other jaw 18 of each said jaw pair is guided for movement in or on its respective jaw chuck 20. To this end, each jaw chuck 20 includes a piston-cylinder device 40 for each jaw pair 17, 18. This piston-cylinder device includes a cylinder 41, a piston 42 and an associated piston rod 43 which is connected to a protective cover 44 which surrounds the cylinder 41 at least partially, the jaw 18 being detachably mounted on the end surface of the protective cover, e.g. by means of at least one bolt 45. Similarly, the protective cover 44 may be mounted detachably to the actual piston rod 43 itself. FIG. 5 illustrates the pocket 19 defined by the jaws 17, 18 and shows the jaws opened to their widest extent, which is greater than the largest pipe diameter for which the jaws are intended by a predetermined number of millimeters, e.g.15 mm. In this position of the jaws, the piston 42 of the piston-cylinder device is located in its rear end position, as illustrated in FIG. 5. Manoeuvering of the piston-cylinder device is also effected with the aid of a swivel 46 which functions to deliver pressure medium to the cylinder 41, on both the piston side and the piston-rod side thereof, such that when a pipe 11 has arrived in the pocket 19 of the jaw chuck in the pipe collecting position, the movable jaw 18 of the jaw pair located in said collecting position is moved into abutment with the pipe 11 in said pocket 19 so as to clamp the pipe firmly. Movement of the movable jaw 18 into clamping engagement with the pipe, however, does not take place until one end of the pipe 11 present in the pocket 19 has been moved longitudinally such as to bring said one pipe-end into abutment with the reference surface 47 mounted on one end of the cutting machine and from which surface each cutting unit 1 is adjusted to its intended position for cutting the piping, or pipes, into the lengths intended. Located in this reference plane is a fixed stop abutment 48, with which one end of each tube is brought into abutment prior to the pipe being clamped between the jaws 17, 18 of said jaw pair in the pipe collecting position in said pockets 19, said stop abutment 48 being in line with said pockets.

Figure 2:
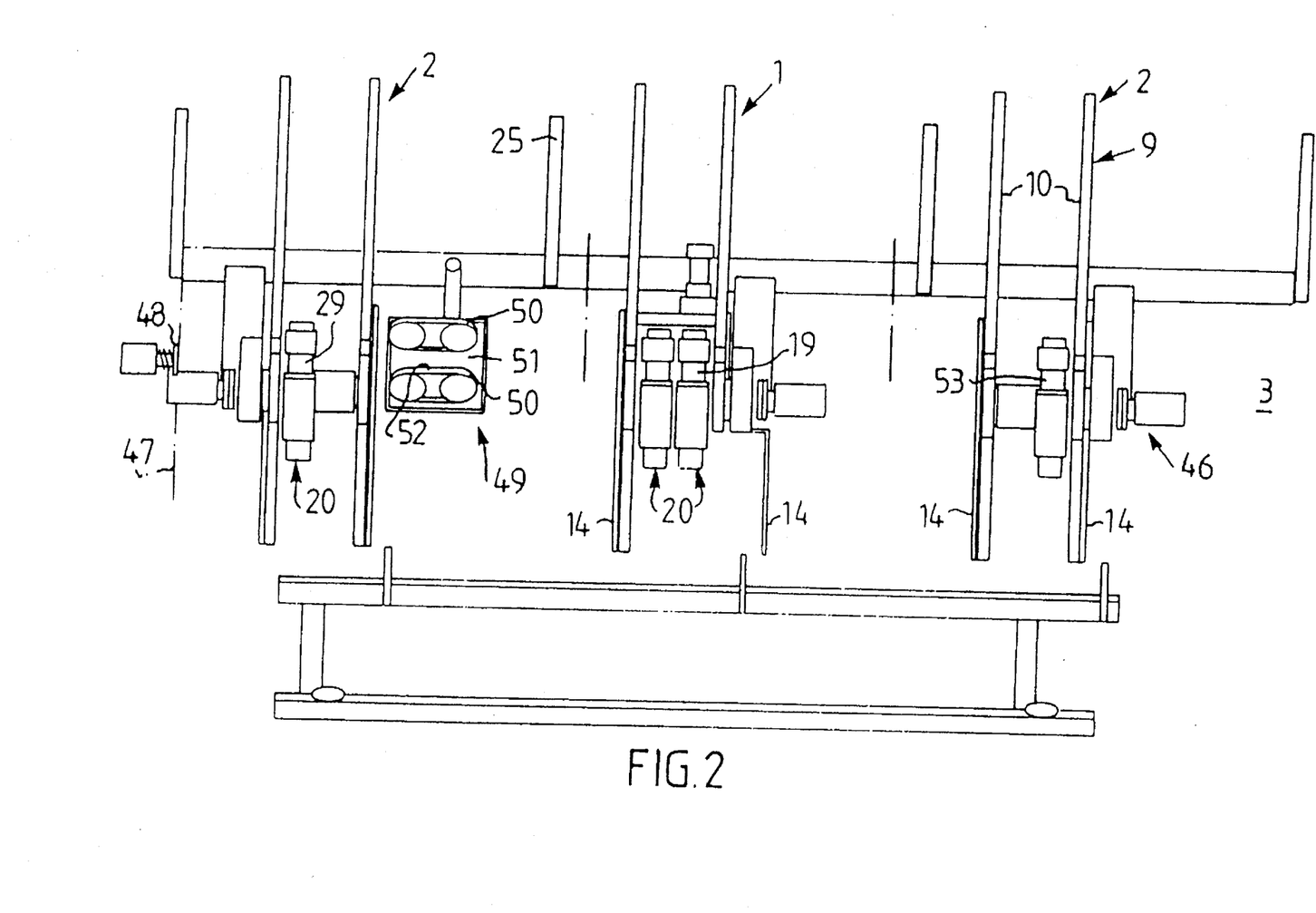

Each pipe 11 is moved longitudinally into abutment with said stop abutment 48 by means of a pipe puller, generally referenced 49, arranged adjacent one of the support trestles 22 located proximal said reference plane 47. One such pipe puller 49 is shown in FIGS. 1 and 2, solely as an example of one of many possible embodiments. The illustrated pipe puller includes two mutually opposing belt assemblies 50, of which at least one, and preferably two are driven and which function to form therebetween a pipe-receiving opening 51 which lies in line with pockets 19 defined by the jaw chucks and located in said collecting position, and which belts are brought into driving engagement with the pipe 11 fed into said opening such as to move the pipe in the direction of its longitudinal axis into abutment with the stop abutment 48. In the collecting or open position, the belt assembly 50 which is located on the same side as the movable jaw 18 of the jaw pair 17, 18 of the jaw chucks located in said collecting position will preferably have its driving belt side 52 located slightly inwards of a line which extends through the inside of the movable jaw 18 in all mutually separated positions of the jaws 17, 18 corresponding to maximum pipe diameter in respect of all support trestles and cutting units located in said pipe collecting position, whereby movement of a pipe 11 fed to said collecting position is commenced immediately, by bringing said pipe directly into contact with said driven inside 52 of the belt assembly, due to the inclination or slope of the jaw chucks or, more specifically, the pocket bottoms 53 in the collecting position.

Thus, in this latter case the belt assembly may be fixedly mounted and, accordingly, only one belt assembly 50 need be movable towards and away from the other belt assembly, so as to ensure that each pipe fed to said collecting position will be moved longitudinally into abutment with the stop abutment 48 located in the reference plane 47 before the jaw 17, 18 of the jaw chucks located in said collecting position firmly clamp the pipe 11.

Figure 4:
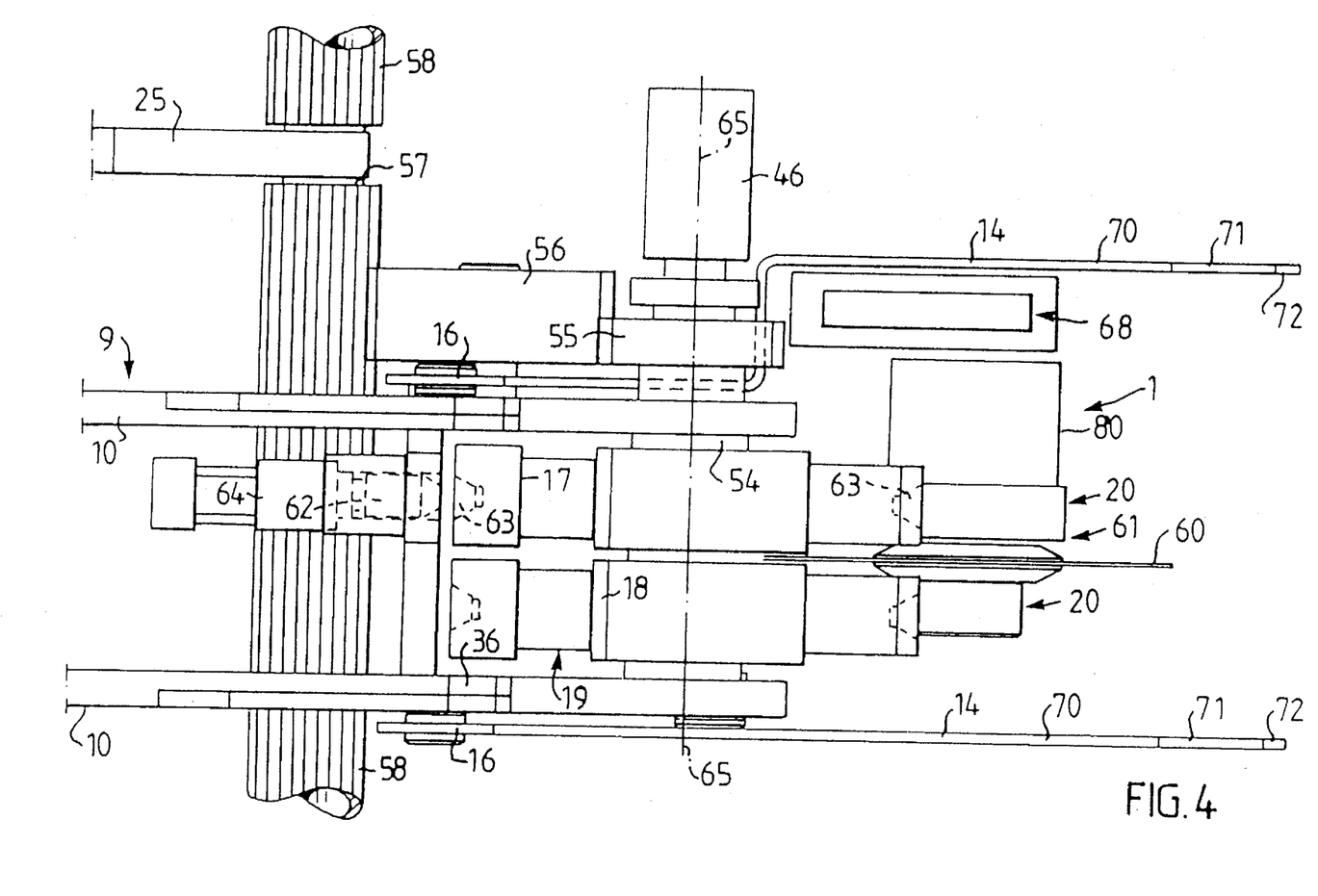
FIG. 4 is a view from above taken generally on the line IV—IV in FIG. 3.

Irrespective of whether it belongs to a cutting unit 1 or to a support trestle 2, each jaw chuck 20 can be rotated and is, to this end, mounted on a journal shaft 54 in the stand 10, said shaft 54 in a cutting unit 1 being common to both jaw chucks 20 of said cutting unit, as illustrated in FIG. 4. The shaft 54 carries a gear wheel 55 which is driven, via an intermediate wheel 56, by a shaft 57 which is journalled in the column stand 25 and which is common to all cutting units 1 and support trestles 2. This shaft 57 carries two rollers 58 which are locked to the shaft 57 and extend between the column stands 24 and which thus mesh with the intermediate wheels 56 such as to enable the gear wheel 55 to be rotated incrementally, or stepwise, and therewith rotate the jaw chuck 20 of respective cutting units and support trestles through an angle of 180° with each step. This stepwise rotation of the gear wheel 55 is achieved with the aid of a rotating device (not shown) which acts on the shaft 57 and which is driven hydraulically, pneumatically or electrically in a known manner. Each time the rotating device is activated, it turns the shaft 57 through an angle corresponding to a rotation of each jaw chuck 20 through an angle of 180°, therewith causing the jaw pair 17, 18 located in the collecting position and clamping a pipe therebetween to be rotated to a cutting position in which the pipe is cut in each cutting unit 1 by a cutting saw 60 mounted in a cutting head 61.

The jaw chuck 20 of each support trestle, and at least one of the jaw chucks 20 of each cutting unit 1 is locked in both the pipe collecting position and the cutting position with the aid of locking pins 62. The locking pins preferably have a truncated, conical shape for coaction with a correspondingly shaped pin hole 63 provided in each end of each jaw chuck 20, and can be moved into and away from a locking position by means of a hydraulic or pneumatic piston-cylinder device 64.

The cutting head 61 of the cutting unit 1 is journalled in a swinging center 65 in the stand 10 of the cutting unit, and a hydraulic or pneumatic piston-cylinder device 66 is mounted between the stand 10 and the cutting head 61 and functions to swing the cutting head 61 around said center 65, and therewith raise and lower the cutting saw 60 towards and away from the cutting position in which a pipe to be cut is located. The cutting saw 60 is located centrally between the two jaw chucks 20 of the cutting unit and is fixedly mounted on a shaft 67 which is driven by an electric motor 69 through the intermediary of a transmission 68 and gear box 80, said motor also being carried by the cutting head 61.

When a pipe is cut in the cutting position, the feeder arms 14 of the feeder are located in their upper positions, so that upon completion of a cutting operation and when the jaws 17, 18 located in said cutting position are mutually separated, the thus cut pipe-lengths will be received on those arm-parts 70 which extend beneath the cutting position and on which the thus cut pipe lengths roll down into a pocket 71 and against a stop device 72, so that when the feeder arms 14 are lowered said pipe lengths will be deposited on a supporting surface 73 for transportation away from the cutting machine.

In brief, the inventive pipe cutting machine operates in the following manner. A pipe 11 lying on the table 9 is brought into abutment with the stop device 12, whereafter the feeder 13 is raised and therewith lifts the pipe abutting the stop device 12 to an upper position, from which the pipe rolls down into the pocket 19 defined by the jaw chucks in the pipe collecting position. The pipe located in the pocket 19 is moved longitudinally by the pipe puller 49 so that one end of the pipe will abut the stop abutment 48. A signal is then sent to the swivel 46, causing pressure medium to be delivered to the piston side of the cylinder 41 of the piston-cylinder device 40 in each jaw pair of the jaw chuck in the pipe collecting position, such as to move the movable jaw 18 to a pipe-clamping position in said pipe collecting position. When the pipe is clamped firmly, the locking pins 62 of the jaw chuck 20 are released at the same time as the shaft 57 carrying said gear rollers 58 is rotated through an angle corresponding to rotation of each jaw chuck 29 through an angle of 80°, so as to transfer the pipe to be cut from the pipe collecting position to the pipe cutting position. As soon as this stage of operation has been reached, respective jaw chucks 20 are locked with the aid of their respective locking pins 62 and the feeder is therewith raised at the same time so as to feed a pipe into the pocket 19 located in the pipe collecting position. Simultaneously therewith, the cutting head 61 with its saw 60 is also moved by its piston-cylinder device 66 so as to cut the pipe held in the cutting position. When he cutting head 61 has reached its upper position and the saw 60 has just sawn through the pipe, the cutting head 61 returns to its lower position and the movable jaw 18 of the jaw pair 17, 18 of each jaw chuck 20 in the cutting position is opened when the saw 60 has just left the pipe 11 during this return movement, whereupon the cut pipe will fall down onto the still raised feeder arms 14 and rolls down said arms into the pocket 71, so that when the feeder is lowered, the pipe will be transferred to the supporting surface 73 for transport away from the machine. The cutting head continues to move to its lower position, whereas the jaw chucks 20 are released and stepped forwards one step in preparation for cutting the next pipe.

Thus, in accordance with the present invention, a pipe is fed into position at the same time as an earlier advanced pipe is being cut, therewith enabling the requisite cycle time to be halved and the capacity to be increased, so as to meet the requirements placed by pipe welding machines on the capacity of pipe cutting equipment.

It will be understood that the invention is not restricted to the aforedescribed and illustrated embodiments thereof, and that these embodiments can be modified and supplemented in many different ways within the scope of the inventive concept as defined in the following claims.

I claim:

1. A method for continuously cutting pipes used in connection with welding, comprising the steps of:

feeding a first pipe to a pipe collecting position;

advancing said first pipe longitudinally into abutment with a reference surface and therefrom to a pipe cutting position;

adjusting a cutting device to cut said first pipe in the pipe cutting position to a length determined by said reference surface;

cutting said first pipe;

simultaneously with the cutting of said first pipe, feeding a second pipe to said pipe collecting position;

removing said cutting device from said pipe cutting position upon completion of the cutting, and simultaneously removing the cut pipe, advancing said second pipe longitudinally into abutment with said reference surface and therefrom to said pipe cutting position;

adjusting said cutting device to cut said second pipe in said pipe cutting position to a length determined by said reference surface; and cutting said second pipe; repeating the steps of the method with each following pipe thereafter; wherein said advancing of said pipes from said pipe collecting position to said pipe cutting position including rotating jaw chucks, each jaw chuck having a pair of gripping jaws.

2. The method according to claim 1 further comprising downwardly releasing said cut pipes onto a feeder located in an upper position for conveying said cut pipes away from said pipe cutting position.

3. The method according to claim 1 further comprising feeding said pipes to said pipe collecting position perpendicularly to their longitudinal axis.

\* \* \* \* \*